US007629986B2

(12) United States Patent
Bobrow et al.

(10) Patent No.: US 7,629,986 B2
(45) Date of Patent: Dec. 8, 2009

(54) MOTION-BASED VISUALIZATION

(75) Inventors: Robert J. Bobrow, Arlington, MA (US); Aaron Mark Helsinger, Somerville, MA (US); Michael J. Walczak, Hudson, MA (US)

(73) Assignee: BBN Technologies Corp., Cambridge, MA (US)

( * ) Notice: Subject to any disclaimer, the term of this patent is extended or adjusted under 35 U.S.C. 154(b) by 0 days.

(21) Appl. No.: 11/961,242

(22) Filed: Dec. 20, 2007

(65) Prior Publication Data
US 2008/0158257 A1 Jul. 3, 2008

Related U.S. Application Data

(60) Continuation-in-part of application No. 11/431,338, filed on May 9, 2006, now Pat. No. 7,315,306, which is a division of application No. 10/703,102, filed on Nov. 5, 2003, now Pat. No. 7,069,520.

(51) Int. Cl.
*G09G 5/00* (2006.01)
(52) U.S. Cl. ..................... 345/629; 345/473; 345/672
(58) Field of Classification Search ................. 345/473, 345/629, 672
See application file for complete search history.

(56) References Cited

U.S. PATENT DOCUMENTS

| | | | |
|---|---|---|---|
| 4,613,946 | A | 9/1986 | Forman |
| 5,267,154 | A | 11/1993 | Takeuchi et al. |
| 6,337,699 | B1 | 1/2002 | Nielsen |
| 6,462,762 | B1 | 10/2002 | Ku et al. |
| 6,509,906 | B1 | 1/2003 | Awe et al. |
| 6,587,787 | B1 * | 7/2003 | Yokota ....................... 701/212 |
| 6,856,329 | B1 | 2/2005 | Peevers et al. |
| 6,961,061 | B1 * | 11/2005 | Johnson et al. ............. 345/473 |
| 7,069,520 | B2 | 6/2006 | Bobrow et al. |
| 7,280,122 | B2 | 9/2006 | Bobrow et al |
| 7,116,749 | B2 | 10/2006 | Besson |
| 7,315,306 | B2 | 1/2008 | Bobrow et al. |
| 2003/0206205 | A1 | 11/2003 | Kawahara et al. |
| 2004/0095378 | A1 | 5/2004 | Vigue et al. |
| 2005/0093867 | A1 | 5/2005 | Bobrow et al. |

(Continued)

FOREIGN PATENT DOCUMENTS

WO    WO-2004095378    11/2004

OTHER PUBLICATIONS

Ahlberg et al., "Dynamic Queries for Information Exploration: An Implementation and Evaluation" In Proceedings of CHI'92. ACM, pp. 619-626.

(Continued)

*Primary Examiner*—Kee M Tung
*Assistant Examiner*—Michelle K Lay
(74) *Attorney, Agent, or Firm*—Ropes & Gray LLP

(57) ABSTRACT

A data-display system employs a display in which the representations of data objects are caused to move on the display in order to convey information about the represented data objects. In one example, icons in a link-analysis display that represent data objects satisfying a selection criterion are made to execute distinctive motion. In another example, three-dimensional models of moving bodies in whose features components of respective data objects are encoded are projected onto a screen plane, and the resultant values are used to generate the display.

34 Claims, 16 Drawing Sheets

U.S. PATENT DOCUMENTS

| | | |
|---|---|---|
| 2005/0114551 A1 | 5/2005 | Basu et al. |
| 2005/0147283 A1 | 7/2005 | Dwyer et al. |
| 2007/0257912 A1 | 11/2007 | Repin |

OTHER PUBLICATIONS

Bartram et al., "Filtering and Brushing with Motion," Information Visualization, 1(1):66-79.

Bartram et al., "Moving Icons: Detection and Distraction," In Proceedings of Interact 2001.

Becker et al., "Brushing Scatterplots," Technometrics, 29(2):127-142, (1987).

Braddick et al., "Serial Search for Targets Defined by Divergence or Deformation of Optic Flow," Perception, 20:345-354, (1991).

Callaghan, T.C., "Interference and Dominance in Texture Segregation," In Visual Search, D. Brogan, Ed. Taylor & Francis, pp. 81-87.

Driver et al., "Motion Cohrence and Conjunction Search: Implications for Guided Search Theory," Perception & Psychophysics, 51(1):79-85, (1992).

Duncan, J., "Boundary Conditions on Parallel Processing in Human Vision," Perceptions, 18:457-469, (1989).

Duncan, et al., "Visual Search and Stimulus Similarity," Psychological Review, 96:433-458, (1989).

Gronquist et al., "Animated Vectors for Visualization of Power System Phenomena," IEEE Transactions on Power Systems, 11(1):267-273, (1996).

Healey, Christopher, "Perceptual Techniques for Scientific Visualization," ACM SIGGRAPH, Course 6, pp. 1-26.

Healey, Christopher, "Visualizing Real-Time Multivariate Data Using Preattentive Processing," ACM Transactions on Modeling and Computer Simulation, 5(3):190-221.

Hunn, Ketil, "Preattentive Visual Information Processing," http://home.eunet.no/khunn/papers/2030.html., Research Proposal, (2000).

McLeod, et al., "Visual Search for a Conjunction of Movement and Form is Parallel," Nature, 332(10):154-155, (1988).

Nakayama et al., "Serial and Parallel Processing of Visual Feature Conjunctions," Nature 320(20):264-265, (1986).

Quinlan, et al., "Visual Search for Targets Defined by Combination of Color, Shape and Size: An Examination of Task Constraints on Feature and Conjunction Searches," Perception & Psychophysics, 41(5):455-472, (1987).

Treisman, "Preattentive Processing in Vision," Computer Vision, Graphics and Image Processing, 31:156-177, (1985).

Treisman, "Search, Similarity, and Integration of Features between and within dimensions," Journal of Experimental Psychology: Human Perception and Performance, 17(3):652-676, (1991).

Ware et al., "Perceiving Data Displayed Through Oscillatory Motion," Tech. Rep. TR94-089, Faculty of Computer Science, University of New Brunswick, (1994).

Wickens, et al., "The Proximity Compatibility Principle: Its Psychological Foundation and Relevance to Display Design," Human Factors, 37(3):473-494, (1995).

Robinson, Anthony C., "Highlighting techniques to support geovisualization," ICA Workshop on Geovisualization and Visual analytics, 2006, pp. 1-18.

Kruecker et al, "Fusion of real-time trans-rectal ultrasound with pre-acquired MRI for multi-modality prostate imaging", Proc. of SPIE - The International Society for Optical Engineering, vol. 6509, Mar. 21, 2007, pp. 650912/1 - 650912/12.

Ramos et al, "Tumble Splat Helping users access and manipulate occluded content in 2d drawings," Proceedings of the Working Conference on Advanced Visual Interfaces, 2006, pp. 428-435.

Lum et al, "Using motion to illustrate static 3D shape - Kinetic visualization," IEE Transactions on Visualization and Computer graphics, vol. 9, No. 2, Apr.-Jun. 2003, pp. 115-126.

International Search Report and Written Opinion dated Sep. 1, 2009 in International Application No. PCT/US2008/013884.

\* cited by examiner

MOTION-BASED VISUALIZATION

RELATED APPLICATION

This application is a continuation-in-part of U.S. patent application Ser. No. 11/431,338, filed on May 9, 2006, now U.S. Pat. No. 7,315,306, which is a divisional application of U.S. Ser. No. 10/703,102, now U.S. Pat. No. 7,069,520, filed Nov. 5, 2003. The contents of each application are incorporated herein by reference.

STATEMENT REGARDING FEDERALLY SPONSORED RESEARCH OR DEVELOPMENT

This invention was made with Government support under Contract No. NMA401-02-C-0019, awarded by the National Imaging and Mapping Agency. The Government has certain rights in this invention.

BACKGROUND OF THE INVENTION

1. Field of the Invention

The present invention is directed to data display. It particularly concerns effectively displaying high-dimensional and complex relational data.

2. Background Information

It is now commonplace to employ computers to sift desired information from databases far too large for individual-human comprehension. Software has been developed for performing analysis of a highly sophisticated nature, and such software is often able to detect trends and patterns in the data that would, as practical matter, be impossible for an individual human being to find.

The converse is often also true. Particularly when the question to be asked does not lend itself to easy definition, computers often have difficulty detecting patterns that are readily apparent to human beings. And this human capability is best brought to bear when the data in question are presented graphically. Data presented graphically usually are more readily understandable than the same data presented only in, say, tabular form. But the degree of the resultant understanding greatly depends on the nature of the display, and determining what the appropriate display should be can present a significant problem.

True, some data almost automatically suggest the type of presentation to which they are best suited. The speed of an airplane as a function of time, for instance, would in most cases simply be presented in a simple x-y plot. And there rarely is any question about the general form of display appropriate to the data that a camera takes. In the former case, the presentation is trivial, since speed and time are the only variables, so they are readily associated with two presentation axes. In the latter, camera case, the data suggest the mode of presentation just as readily, since the domain is a two-dimensional scene and the range is spanned by the colors conventionally employed in printing or presentation on a display screen.

But the way to represent many other types of data is significantly harder to determine. An example is hyperspectral data. Typically, such data are similar to those that result from a camera in the sense that the domain is usually a two-dimensional scene. But the value taken for each picture element ("pixel") in the scene is not a vector representing visible-color components, such as red, green, and blue or cyan, magenta, and yellow. Instead, it is a vector consisting of a relatively large number of components, each of which typically represents some aspect of the radiation received from a respective wave-length band. And the bands often fall outside the visual range. Because of the data's high dimensionality and the limited dimensionality of human visual perception, some degree of selectivity in data presentation is unavoidable, and the decisions that are involved in making the selections have a significant impact on the presentation's usefulness to the human viewer.

High dimensionality also occurs in other kinds of data. In large medical, forensic, and intelligence databases, for example, data objects may represent respective individual people, and the dimensions may be age, gender, height, weight, income, etc.

And presentation problems can arise even in data sets that are not necessarily high-dimensional. Consider link analysis, for example. This type of analysis is used to study subjects as disparate as communications networks and criminal enterprises. Its purpose is to find helpful patterns in the connections between studied entities. To help the user detect such patterns, nodes on a display represent various entities, and lines connecting the nodes represent various relationships between them. In the case of communications networks, for example, the nodes may be, say, Internet Protocol ("IP") routers, and the lines would represent the interconnecting communication links. In the case of a criminal enterprise, the nodes may represent people, organizations, buildings, or other entities under surveillance, while the lines may represent known communications between the entities or represent other relationships, such as ownership, legal control, etc. If the amount of data being presented is large, the resulting diagram can be hard to comprehend even if the underlying data dimensionality is low.

To help human users employ such diagrams effectively, presentation systems have provided features that make important patterns "stand out" from the other data represented. For example, some link-analysis systems employ color, thickness, etc. to highlight the nodes and/or relationships that meet criteria of particular interest. A similar approach is commonly used in "brushing," which is sometimes used when representations of the same data objects are displayed simultaneously in different relative locations in different displays. (The displays can be on the screens of different monitors, for example, or on different parts of a single monitor's screen). In brushing, a user employs a mouse or other device to select a subset of the objects represented by icons in one display, and the display system highlights other display's objects that represent the same objects.

SUMMARY OF THE INVENTION

We have devised ways of enhancing the effectiveness with which such systems display data to human users. In accordance with one aspect of the invention, for example, we adapt to link analysis a technique described in Bartram & Ware, "Filtering and Brushing with Motion," *Information Visualization*, vol. 1, No. 1, pp. 66-79. Whereas it is commonplace to use motion for animation and other display of time-dependent data, that paper proposes extending it to data that are not necessarily time-based, i.e., to use it to represent non-time-based dimensions of the data.

We have recognized that this technique can be adapted to link-analysis systems. Specifically, by imparting distinctive motion to chosen nodes in a node-link or similar display, we distinguish them from other nodes. Thus using motion instead of, say, color to highlight those nodes tends to make their membership in the criterion-satisfying subset apparent to the human user without obscuring other information that the display contains. We also apply this approach to brushing.

In accordance with another aspect of the invention, we provide the motion in a way that turns out to be particularly effective in displays whose data-object density is high. Specifically, we generate for each of a plurality of the data objects a model of a moving three-dimensional body located in a three-dimensional model space, and we project the resultant ensemble of bodies into a display surface to obtain the values with which to generate the display. This tends to make patterns stand out even in information of relatively high dimensionality.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
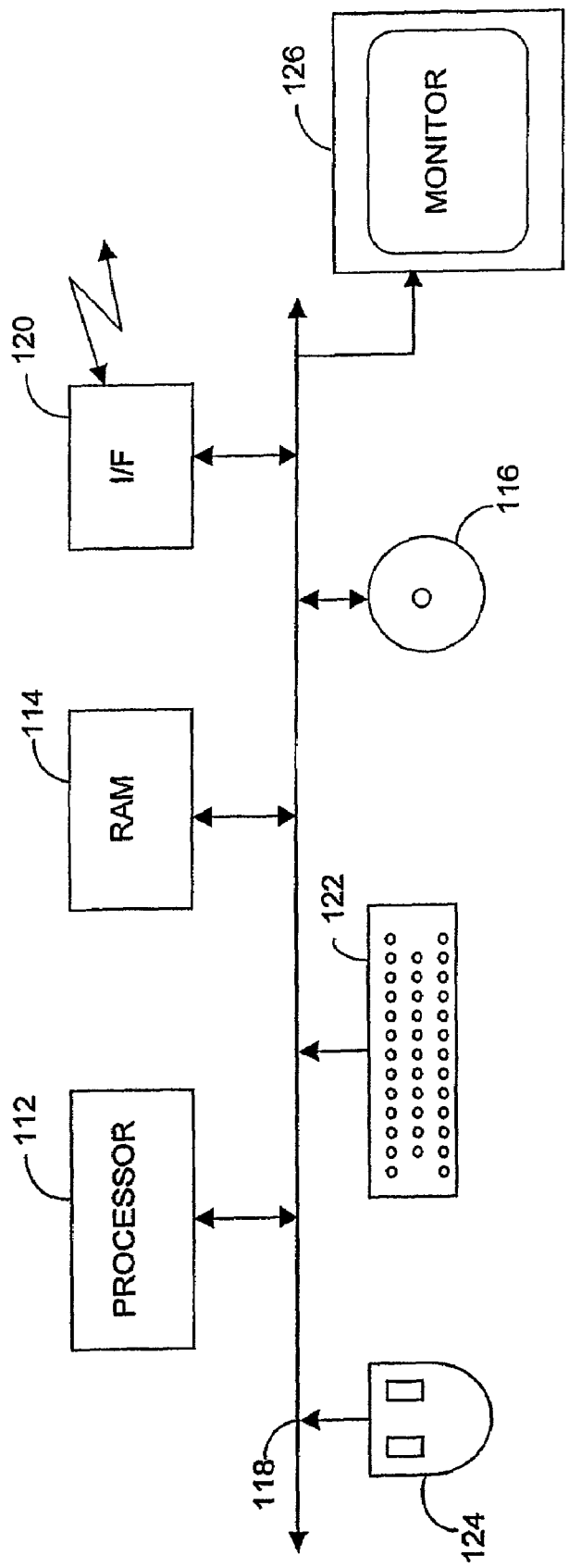
FIG. 1 is a block diagram of a computer system in which the present invention's teachings may be implemented.

The present invention can be implemented on a wide range of hardware and/or software, of which FIG. 1 an example. FIG. 1 corresponds to a data visualization system 100. The data visualization system 100 includes a processor 112, which operates in accordance with instructions loaded into a memory 114. The instructions will ordinarily have been loaded into the memory from a computer readable medium such as local persistent storage in the form of, say, a disc drive 116 with which the memory communicates by way of a local bus 118. The instructions may additionally or instead be received by way of a communications interface 120 from a remote instruction source, which would usually be some sort of persistent storage, too. The disc drive 116 may also store image data for presentation by the data visualization system 100 on a local or remote monitor 126. The system may also receive user input from devices such as a keyboard 122 or mouse 124.

The instructions indicate to the processor how it is to operate on data typically received in ways similar to those in which the instructions are. In accordance with some of those data operations, the instructions cause the processor to present some of the data to one or more human users by driving some type of display, such as the local monitor 126.

The present invention's teachings can be applied to representing a wide variety of data objects. One of the invention's aspects is particularly applicable to data that specify various types of relationships between data objects that the data also represent. For example, the data may represent the results of criminal investigations: certain of the data objects may represent surveillance targets such as people, buildings, or businesses. Of particular interest in the context of link analysis, some of the objects may include references to other objects.

Figure 2:
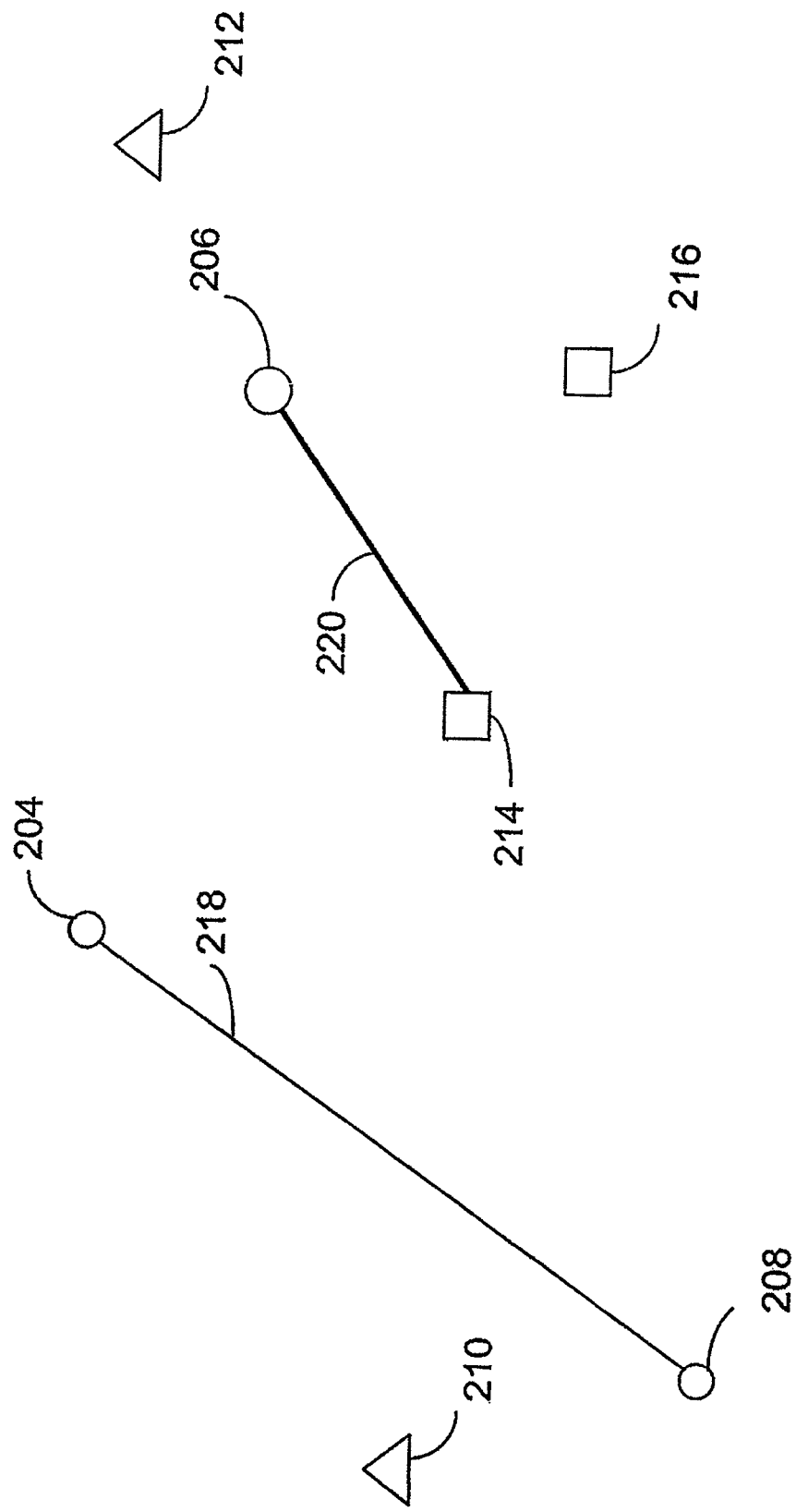
FIG. 2 is diagram of a display of the type often employed for link analysis.

FIG. 2 illustrates in a simplified manner how the system may present the objects in a display for link analysis. Each of the nodes 204, 206, 208, 210, 212, and 214 represents a different data object. For purposes of illustration, the drawing employs more than one style of icon to represent the nodes. This is not a necessary feature of the invention, but thus varying the icon type is one way to impart additional information. If the objects represent surveillance targets, for example, one of each object's fields may indicate what type of target it is, e.g., whether the target is a person, a building, a business, etc. If so, the types of icons placed at those nodes can represent that aspect of the object's contents. In the illustrated example, the icons at nodes 204, 206, and 208, represent people, those at nodes 210 and 212 represent corporations, and those at nodes 214 and 216 represent buildings.

So a display feature such as icon shape can be used to represent one of the data's dimensions. Another dimension, such as the priority assigned to the target's surveillance, may be represented by the icon's color. Also, although the nodes' locations on the display are essentially arbitrary in some link-analysis applications, they represent some aspect of the data, such as the target's geographical location, in others.

In some fashion, the data also specify relationships among the objects. For example, each object may include fields whose contents represent relationships to other data objects or represent pointers to arrays of such fields. Such a field may include, say, a pointer or handle to the object linked by the represented relationship and may also include information about the relationship's type. The display's lines represent those relationships, and, in this example, the line style conveys information, too. For example, line 218, which is relatively thin, represents the fact that the target represented by node 206 has communicated by telephone with the target that node 208 represents. And line 220, which is thicker, indicates that target 206 owns target 214. Other types of relationships may be represented by dashed lines, arc-shaped lines, etc.

Figure 3:
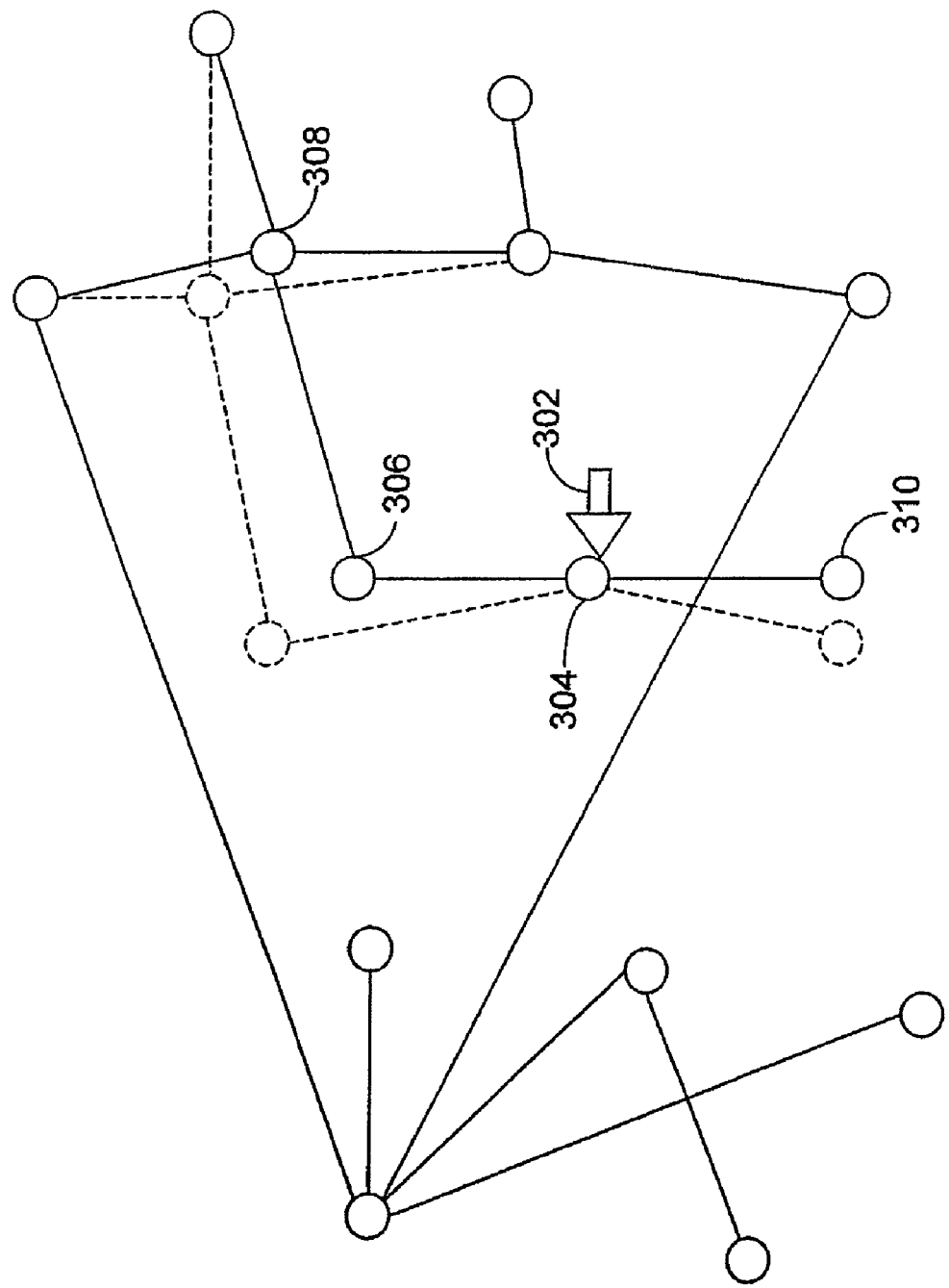
FIG. 3 is a diagram that illustrates the result of using such a display in accordance with one of the invention's aspects.

For the sake of simplicity, FIG. 2 shows only a few nodes and lines. In most situations to which graphical link analysis is applied, though, the number of nodes and lines is much greater, so the display is often difficult to comprehend. One of the present invention's aspects serves to aid comprehension. According to this aspect, the system selectively moves icons for this purpose. Suppose, for example, that the user wants to see all targets that satisfy some criterion. For the sake of simplicity, let us assume the criterion that the target has to be within two communications links from a base target. The user may have chosen the base target by, say, "clicking" on it. To identify the targets that meet this criterion, the display system causes their icons to move. FIG. 3 illustrates this. Cursor 302 represents the user's choosing node 304, and the dashed lines represent the resultant motion of nodes 306, 308, and 310, which satisfy that criterion. In most displays, the lines connected to the nodes will "rubber band," i.e., will so stretch with the node movement as to remain connected despite that motion.

That example uses a direct form of user input: the user employs a mouse to select one of the targets. But link analysis does not always require that type of input. For example, the criterion may be that motion is imparted to nodes representing all targets owned by high-priority targets; i.e., the selection is totally data driven.

This approach to representing the data is advantageous because, although the user could, by careful attention, identify the targets that are within two communications links of the chosen target, making them move causes them to "jump out" at the viewer, and it can do so without, say, changing any colors and thereby obscuring originally presented information.

A similar approach can be applied to what is often termed "brushing," which is a technique often employed when multidimensional data are presented in more than one display simultaneously. For example, the axes in one display may represent one pair of the data components, while those in a different display may represent a different pair. As another example, consider a situation in which at least one of the displays is an income histogram in which each of the bars is considered to be a stack of icons representing respective people whose incomes belong to the corresponding income range, while another display is an age histogram of the same people. In yet another example, one or more of the diagrams is a cluster diagram: icons representing different objects are clustered together in accordance with some similarity metric computed as some function of the objects' data components.

In brushing, a user in some fashion selects a subset of the object-representing icons in one of the displays, and the display system indicates which of the icons in the other display correspond to the same data objects. The user may, for example, select objects by causing a cursor to touch the corresponding icons or draw an enclosure about them; in the histogram case the user may simply click on one of the bars. Or he may select the objects in some other manner, such as by entering a selection criterion. To identify the corresponding icons in the other display, some conventional display systems highlight the other display's icons that correspond to the same objects. But conventional highlighting can obscure the information provided by, for instance, color. Using motion instead avoids this effect.

Figure 4:
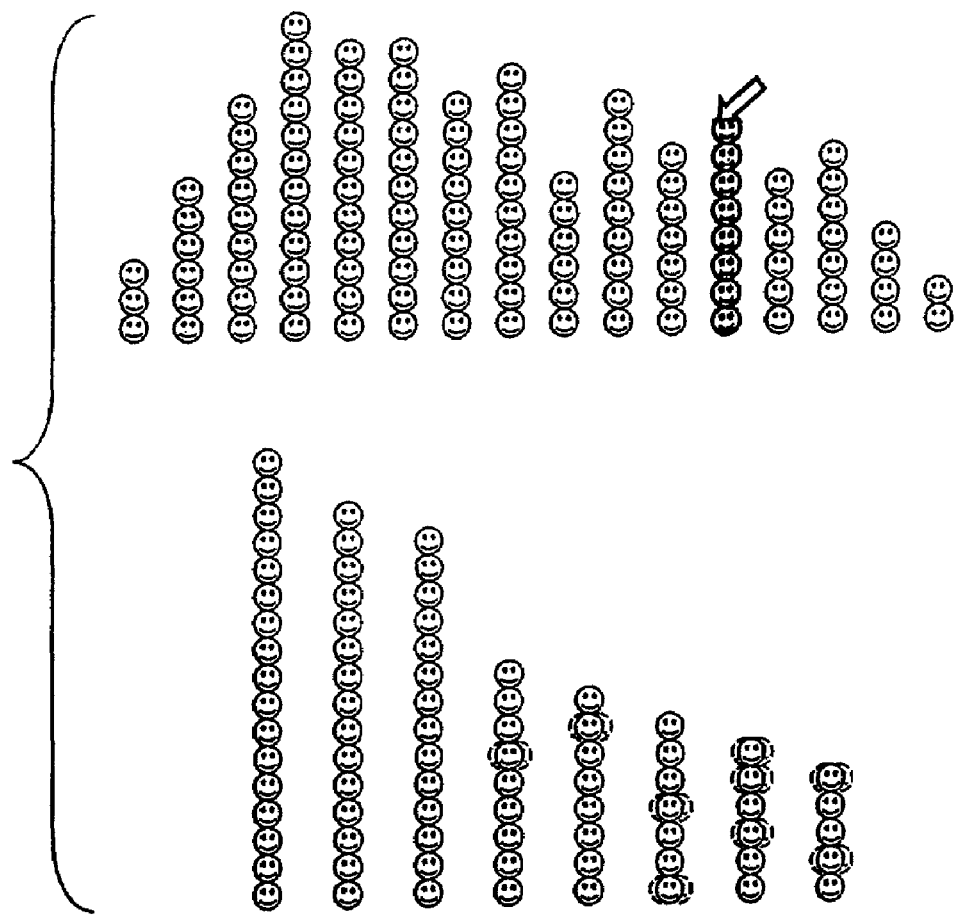
FIG. 4 depicts exemplary histograms in which brushing is being performed.

FIG. 4 illustrates this type of brushing for a situation in which both displays are histograms of the type described above. In that drawing's upper plot, the user has selected one of the income bins, and, by moving the corresponding icons in the lower plot, the display system illustrates the user-selected income group's distribution among the various age groups.

The use of different types of motion can be used in link displays and brushing, too. In those types of displays, the icons meeting a given criterion need not all move in the same way or in synchronism with each other. But consider an embodiment that operates as follows. The user first clicks on one target to cause the system to emphasize the relationships with that target, and the system responds by causing the criterion-satisfying nodes to vibrate vertically. If the user then clicks on another target while, say, holding down the shift key, he thereby indicates that the system should point out the targets linked to newly chosen target while continuing the previous vibrations, and the system causes the targets linked to the newly selected target to vibrate horizontally instead of vertically.

In that simple example, the distinction is between two directions of linear motion. Both other types of motion can be used instead or in addition. Both these types of linear motion could be distinguished from diagonal linear motion, for example. Distinctions could also be made on the basis of phase or frequency: two sets of nodes vibrating linearly in the same direction could be caused to vibrate out of phase with each other, or at different frequencies. Also, the motion need not be linear; it may be elliptical, for instance, in which case another distinction can be made on the basis of whether the motion is clockwise or counterclockwise. And the motion is not necessarily a change in position from some rest position; it can, for instance, be a change in shape, such as rhythmic expansion and contraction of the icon that represents the data object.

Figure 5A:
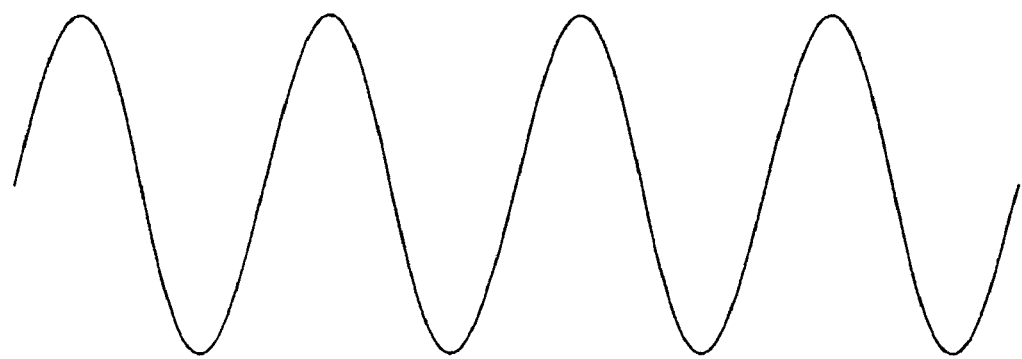
FIGS. 5A, 5B, and 5C are plots of one component of the motion of a body that represents a data object in accordance with the present invention.
Figure 5B:
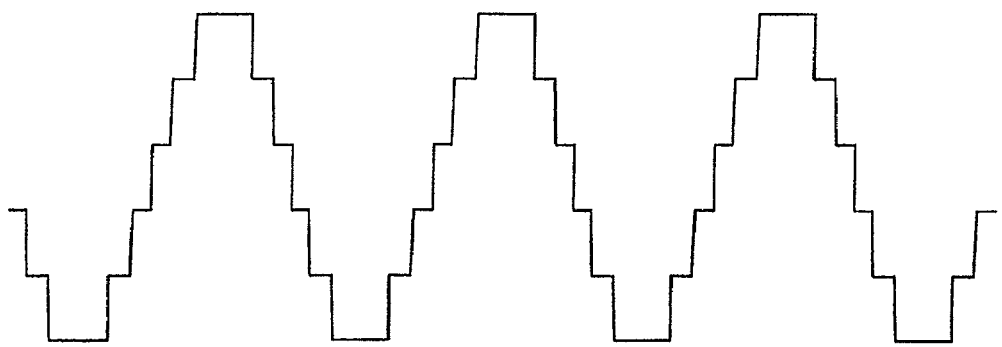
Figure 5C:
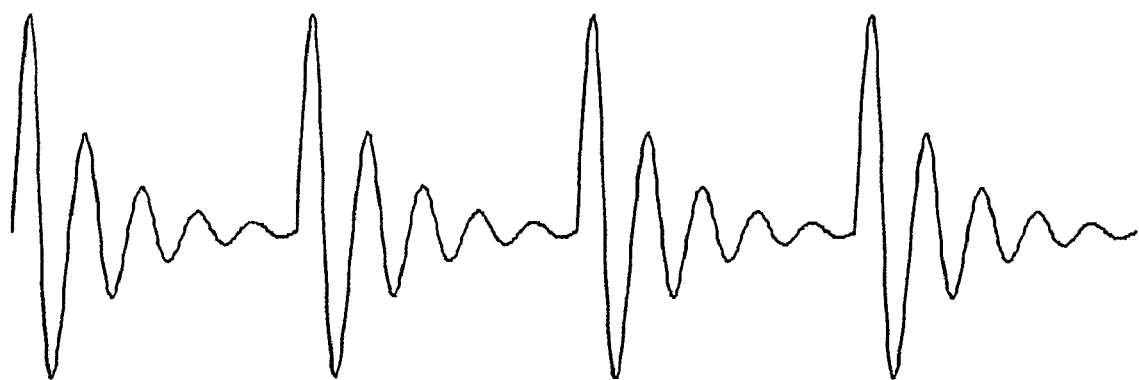

Nor does the motion have to be harmonic vibration. Among the many motion patterns that may be employed are those of which FIGS. 5A, 5B, and 5C depict one component. (In the case of elliptical motion, for example, the plot of FIG. 5A would be the component parallel to, say, ellipse's major axis, with which the motion component parallel to the minor axis would be 90.degree. out of phase). The harmonic motion that FIG. 5A depicts is typical. But some embodiments may instead or additionally employ other types of motion, such as the stuttering motion of FIG. 5B. Another example is the repeatedly decaying harmonic motion that FIG. 5C illustrates. Moreover, distinctions can be made and additional information imparted not only by the selection of the general type of motion pattern but also by the particular parameters of that motion. When the repeatedly decaying motion of FIG. 5C is employed, for example, some of the bases for distinguishing among data sets or conveying information about individual data objects can be the rate of decay, the repetition rate, etc.

In any event, thus using motion for graphical link analysis, layer-type displays, and similar data-presentation techniques can significantly enhance the user's comprehension.

Figure 6:
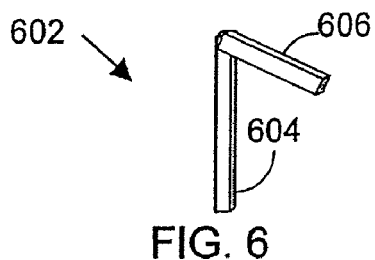
FIG. 6 is a diagram that illustrates one kind of three-dimensional body in whose features an object's data can be encoded in accordance with one of the invention's aspects.

Another aspect of the invention is directed to the way in which the motion is generated. According to this aspect of the invention, the motion results from depicting moving three-dimensional bodies on the display. Each body represents a respective data object, and various features of the body's motion represent respective components of data object's multi-dimensional data. The particular type of body is not critical, but FIG. 6 depicts for the sake of example a simple body type that we have employed. In that drawing, body 602 includes nothing more than an upright 604 and an arm 606 attached to the upright.

The benefits that this type of motion generation affords extend beyond data-presentation techniques of the type described so far. For example, consider a system in which the data objects are pixel data for a "hyperspectral" image. In natural-vision images, each pixel is usually represented by a color vector consisting of components for, say, red, green, and blue, cyan, magenta, and yellow, or some similar set of values by which a natural color can be approximated. The data are often the output of a camera whose sensors measure radiation intensities within different visible-light bands. Hyperspectral images are similar in the sense that each pixel is represented by a vector whose components represent radiation within different wavelength bands. The difference is that the number of wavelength bands is usually much more than three, and most bands do not fall within the visible range. Also, although the values usually represent intensities; they may additionally or instead represent other quantities, such as Stokes parameters.

Some of such data's dimensionality can be encoded in the colors of a false-color image, but it will enhance a user's ability to detect patterns if some components are encoded in aspects of a three-dimensional body's motion. As will become apparent, this technique's applicability is not limited to hyperspectral imaging; it can be used on a wide range of data types, independently of their dimensionality. But its advantages will be most apparent in scene-type data, such as hyperspectral-sensor data, magnetic-resonance-imaging data and other data whose objects tend to be organized in arrays.

Figure 7:
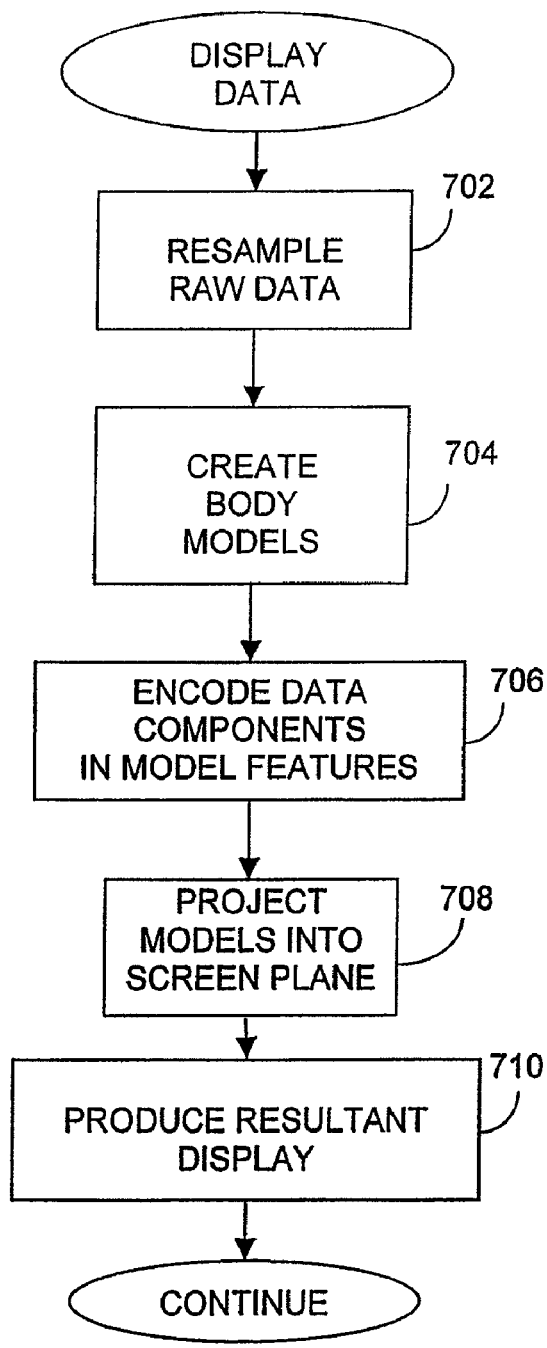
FIG. 7 is a flow chart of the manner in which one embodiment of the invention operates.

FIG. 7 is a conceptual block diagram of the overall approach. The raw data will typically be in the form of a two-dimensional array of high-dimensional pixel values. That is, the object's position in the array implicitly encodes the two-dimensional location of the pixel that the (high-dimensional) object represents, although there is no reason in principle why three-dimensional-location information could not be stored, in a three-dimensional array. In some cases, the raw data's location granularity is coarser or finer than is convenient for employing simulated three-dimensional bodies to represent the objects, so the data may be re-sampled, as block 702 indicates, typically by employing one of the standard multi-rate sampling techniques.

A body model is then constructed for each object, as block 704 indicates. As an example of how this may be done, consider FIG. 8. That drawing depicts two bodies 802 and 804 in a (three-dimensional) model space. The original image plane is mapped to a map plane 806 or other two-dimensional map surface in model space, and the bodies 802 and 804 are assigned zero-displacement positions at the locations in the model space to which the pixels that they represent are mapped. For example, a body's zero-displacement position may be considered to be the one at which its upright is oriented perpendicular to the map plane and intersects the map plane at the upright's midpoint.

Each of a plurality of a given data object's components are then mapped to various aspects of the moving body's features, including size, rate and/or mode of motion, and position. For example, the value of one of the data components—e.g., intensity, another Stokes parameter, or some other radiation-indicating quantity in the hyperspectral example—may be encoded in—the arm's elevation angle 810. Another component—say, another of the Stokes parameters for the same band—may be encoded in the arm's rate and direction of azimuthal rotation 812. Also, pitch, roll, and yaw axes may be defined with respect to the normal to the map plane, and various components may be encoded in the upright's roll, pitch, and yaw angles and in those angles' rate of change. And components can be encoded in the body's size. For example, some embodiments may encode certain components in the arms' and uprights' lengths or thicknesses or in ratios of those lengths or thicknesses or in the rates at which any of those change.

If the upright, too, is made to move, other components can be encoded in various aspects of that motion. If the motion is simple up-and-down motion, for example, data components can be encoded in the upright's mean position (with respect to its zero-displacement position) and in the amplitude, phase, and frequency of its vertical motion. If the upright's motion is more complex, further components can be encoded in that motion's other aspects. Note also that some of these features do not require that the body move.

Also, there may be an element of indirectness in the motion coding. Suppose, for example, that the system attributes physical characteristics such as mass, elasticity, etc. to the bodies and that one or more components are encoded into such features. Suppose further that the bodies are simulated as being disposed in a gravitational field and/or as being attached to a common platform that undergoes some type of motion, such as rhythmic or irregular translation or pivoting.

By encoding the data components directly into those features, the system encodes the data indirectly in the motion: the types of motion that the bodies undergo depend on the underlying data, so, again, the display may reveal patterns in the data. Similar effects may be exhibited if the system simulates wind flowing past the bodies. For such a system, it may be desirable for the bodies to take the forms of flexible reeds in whose features the object components are so encoded as to affect the reed's flexibility. Other forms of indirect encoding will also suggest themselves to those skilled in the art.

Our experiments so far have concentrated on a simple body of the type that FIG. 6 illustrates, and we have concentrated on five shape parameters and twelve motion parameters. The shape parameters on which we have concentrated are the upright's height, the arm's length, the angle that the arm forms with the upright, the upright's angle with respect to the map plane, and the arm's azimuth, i.e., its position around the upright. The motion parameters came in four categories: azimuthal rotation of the upright, changes in the entire body's vertical position, circular changes in its horizontal position, and changes in the upright's tilt angle. The time variation of the motion in each case was a simple sinusoid, so there were three parameters, namely, amplitude, frequency, and phase, within each of the four categories. A further parameter within at least the first three categories is the mean, or "rest" position about which the motion occurs. A data component can be encoded in the difference between this and the zero-displacement position to which the corresponding pixel has been mapped. These parameters can be considered akin to shape parameters, since they do not themselves require motion.

FIG. 7's block 706 represents all such encoding. It is apparent that, at least theoretically, an extremely high number of different data components can thus be encoded in a body's features. As a practical matter, of course, there comes a point at which the resultant visual information becomes overwhelming to the human viewer. But we believe that a human viewer can effectively comprehend patterns resulting from up to fifteen and possibly more different components encoded in this fashion.

Figure 8:
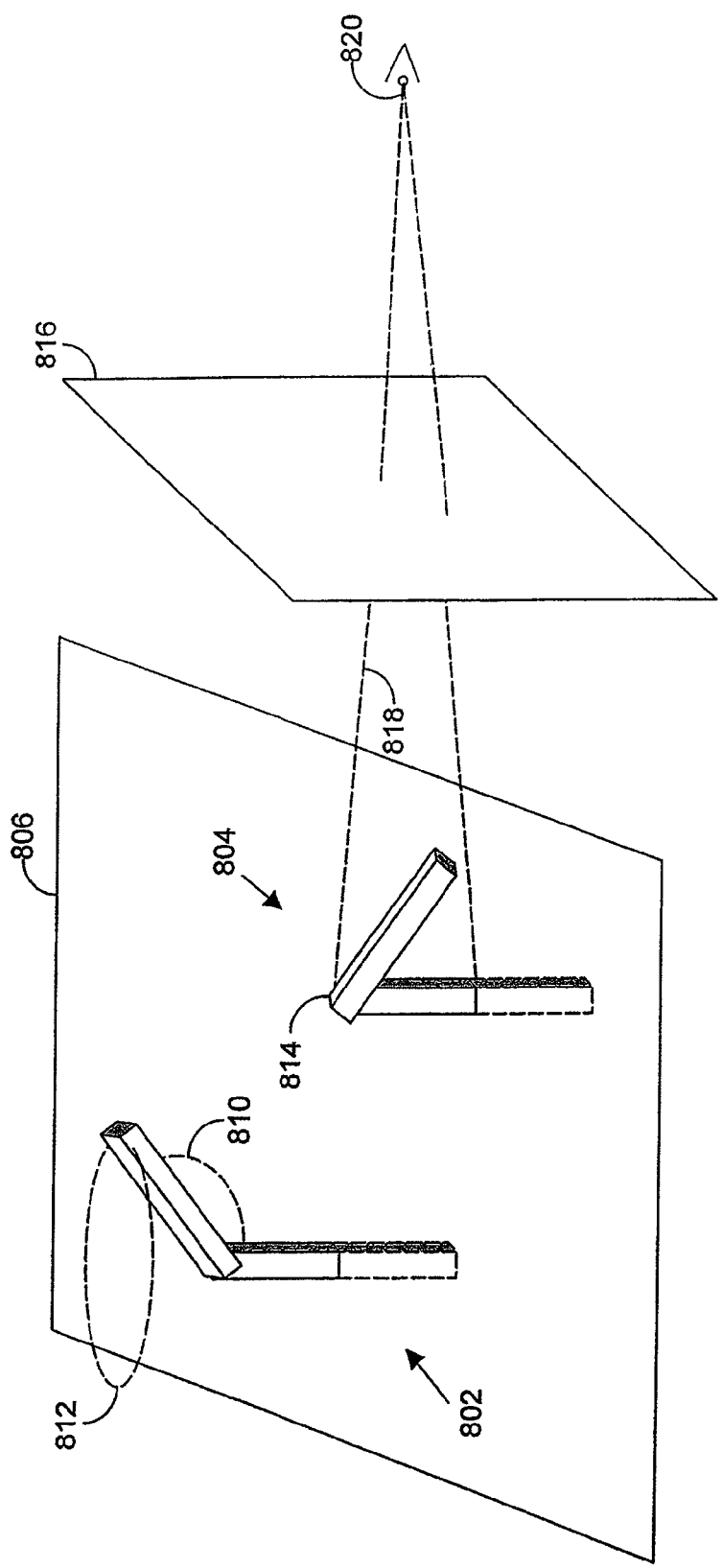
FIG. 8 is a diagram that illustrates one way in which a display can be generated from three-dimensional models that represent data objects in accordance with one of the present invention's aspects.

With the information thus encoded, the system generates the display by mathematically projecting the three-dimensional models onto a screen plane, as FIG. 7's block 708 indicates. The map and screen planes may be parallel, but the invention's advantages are most apparent when there is some angle between those planes. FIG. 8 depicts a perspective projection, i.e., one in which points such as point 814 in the model space are projected onto the screen plane 816 along a line such as line 818 from the model-space point to a common viewpoint 820 located a finite distance away. More typically, the projection would be orthogonal: the viewpoint would be disposed at an infinite distance. In any event, the display would then be so driven as to produce the resultant image, as FIG. 7's block 710 indicates.

Figure 9:
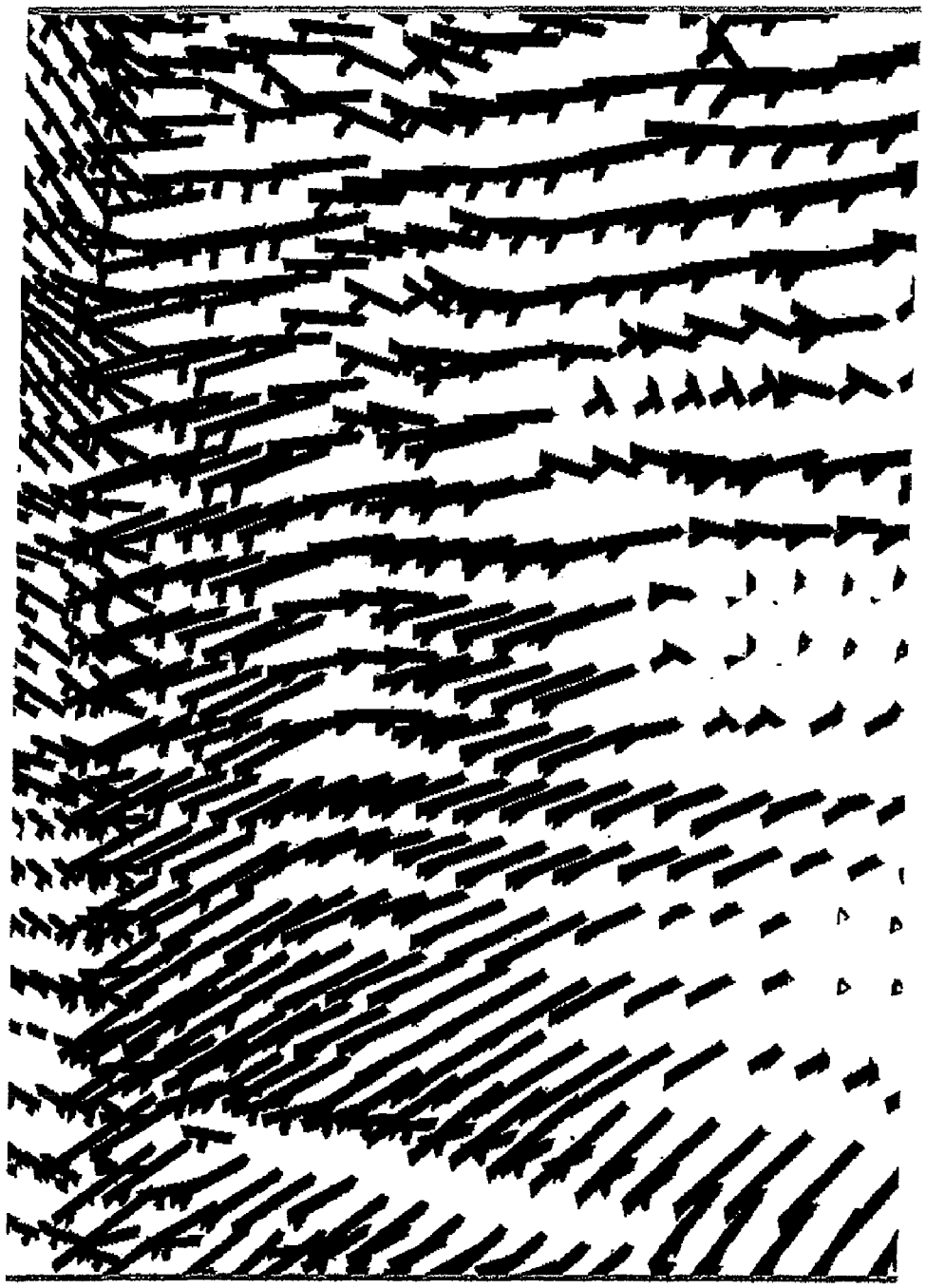
FIG. 9 depicts a small segment of a display generated by projecting such models.
Figure 10:
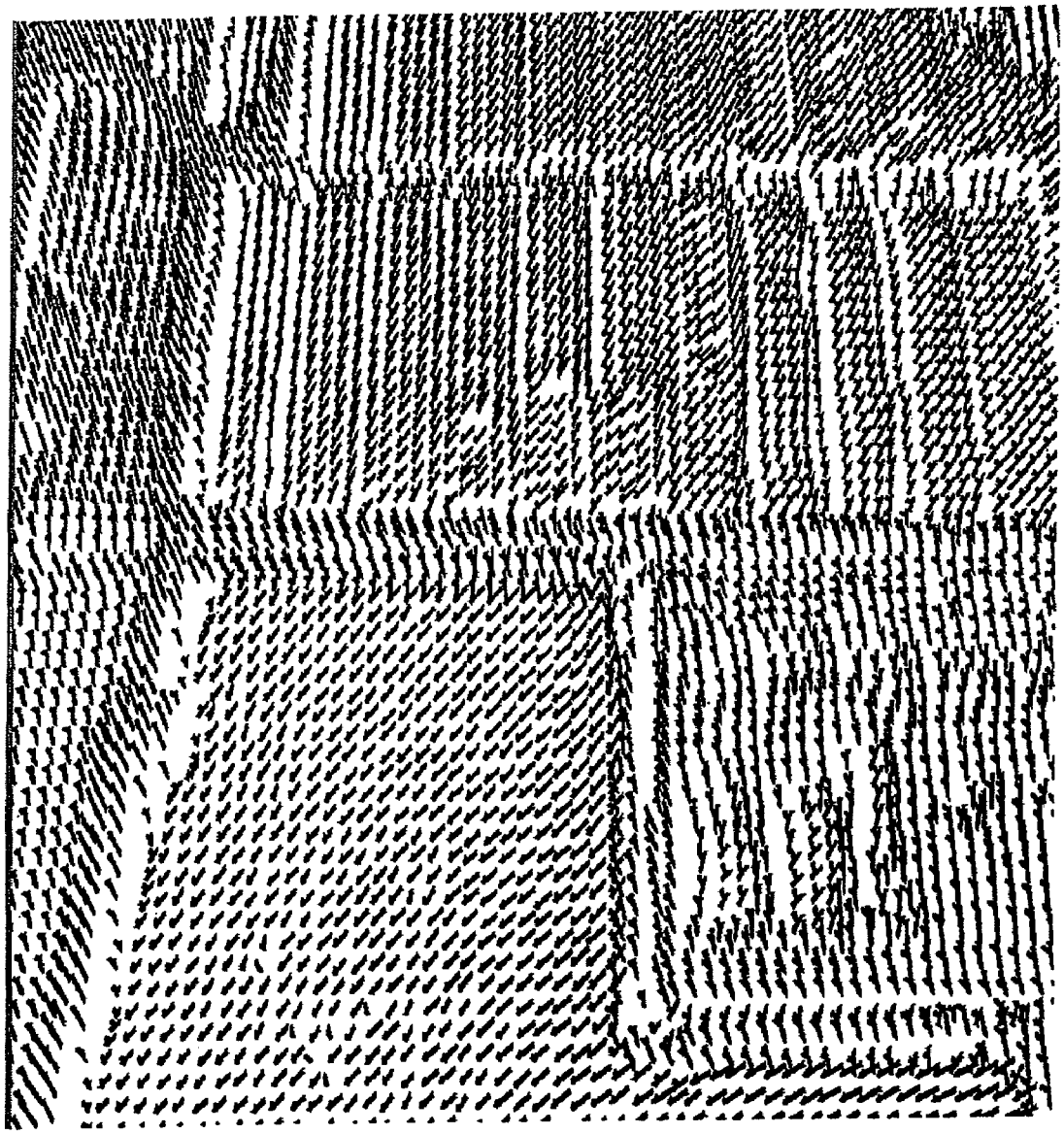
FIG. 10 depicts a larger segment of such a display.

FIG. 9 depicts a small portion of a display that can result when the map plane forms a relatively small angle with the screen plane. The projections of some of the bodies are so small as to be nearly imperceptible, while other bodies' projections are quite long. Although data components are thus encoded, the user typically would not, in that example, directly infer the values of an individual data object's components from the display. He would instead observe overall patterns, possibly of the type that FIG. 10 illustrates, from which he may be able to infer information about the scene or identify avenues for further inquiry.

By employing the present invention's teachings, a display system can enable a user to detect patterns readily in a presentation of highly complex data. The invention thus constitutes a significant advance in the art.

Another type of display that benefits from the use of motion to distinguish different sets of data is the type that employs "layers" of data. A simple example is simultaneous presentation of different sets of transistor characteristic curves. A bipolar transistor's characteristics are often given as a set of curves on a common graph, each curve depicting collector current as a function of collector-to-emitter voltage for a different value of base current. To compare transistors, it would be helpful to be able to compare their characteristic curves visually. One way to do this is to plot different transistors' curve sets on the same axes.

Although different transistors' data can be distinguished from each other by assigning different colors to different transistors' curves, the results rapidly become hard to read as the number of transistors grows; even three transistors' data can present a challenge to comprehension. Moreover, using color to distinguish one transistor's data from another's prevents another use of color, namely, to indicate which curves for the different transistors correspond to the same base current. True, the display system can employ different line styles (solid, dashed, etc.) to help the viewer distinguish the data, but the display still rapidly becomes confusing as data are added for more transistors.

This type of display may be referred to as a "layered" display because different transistors' curves can be thought of as being disposed on transparent sheets, or "layers" that lie on top of one another. To highlight data found in a layer of interest to a user, a first motion is imparted on the entire layer of interest relative to the remaining layers. If a user is interested in more than one type of data, additional layers may be set in motion. Each layer is imparted with a distinctive motion relative to the remaining layers. For example, a first layer may be vibrated horizontally, a second layer may be vibrated vertically, and a circular motion may be imparted on a third layer. In the example above, each transistor curve may be assigned to its own layer. A user may then select two transistors for particular attention from a group of, say, ten whose data a display presents. In response, the display may make one selected transistor's curves vibrate vertically and the other's vibrate horizontally. The user could then readily recognize which data belong to the chosen transistors, and the comparison could be aided by having a given curve color represent the same base-current value for all transistors. Graphics software known in the art, including DirectX provided by Microsoft Corporation of Redmond, Wash., and OpenGL, an open source graphics library originally made available by Silicon Graphics, Inc. of Sunnydale, Calif., provide functionality for the display of layered images, as well as imparting relative motion to layers within such layered images.

In layered displays, each layer preferably includes data sharing a common characteristic. For example, each layer may include data generated from a different imaging source. An image source may be an image capture device or a data storage medium independent of an image capture device. For images formed from layers generated by multiple image capture sources, each image capture device may emit or detect electromagnetic radiation of different wavelengths or energies. For example, one image source may generate images from light in the visible spectrum. A second image source may generate images from light in the infrared portions of the spectrum. A third image source may generate images from light in the ultraviolet portions of the spectrum. Similarly, X-ray images generated from multiple emission energies may be stored as separate layers. Other suitable image capture devices include, without limitation, radar systems, ultrasound devices, geophones, gravitational field sensors, or any sensor that outputs data in relative to spatial position.

Figure 11A:
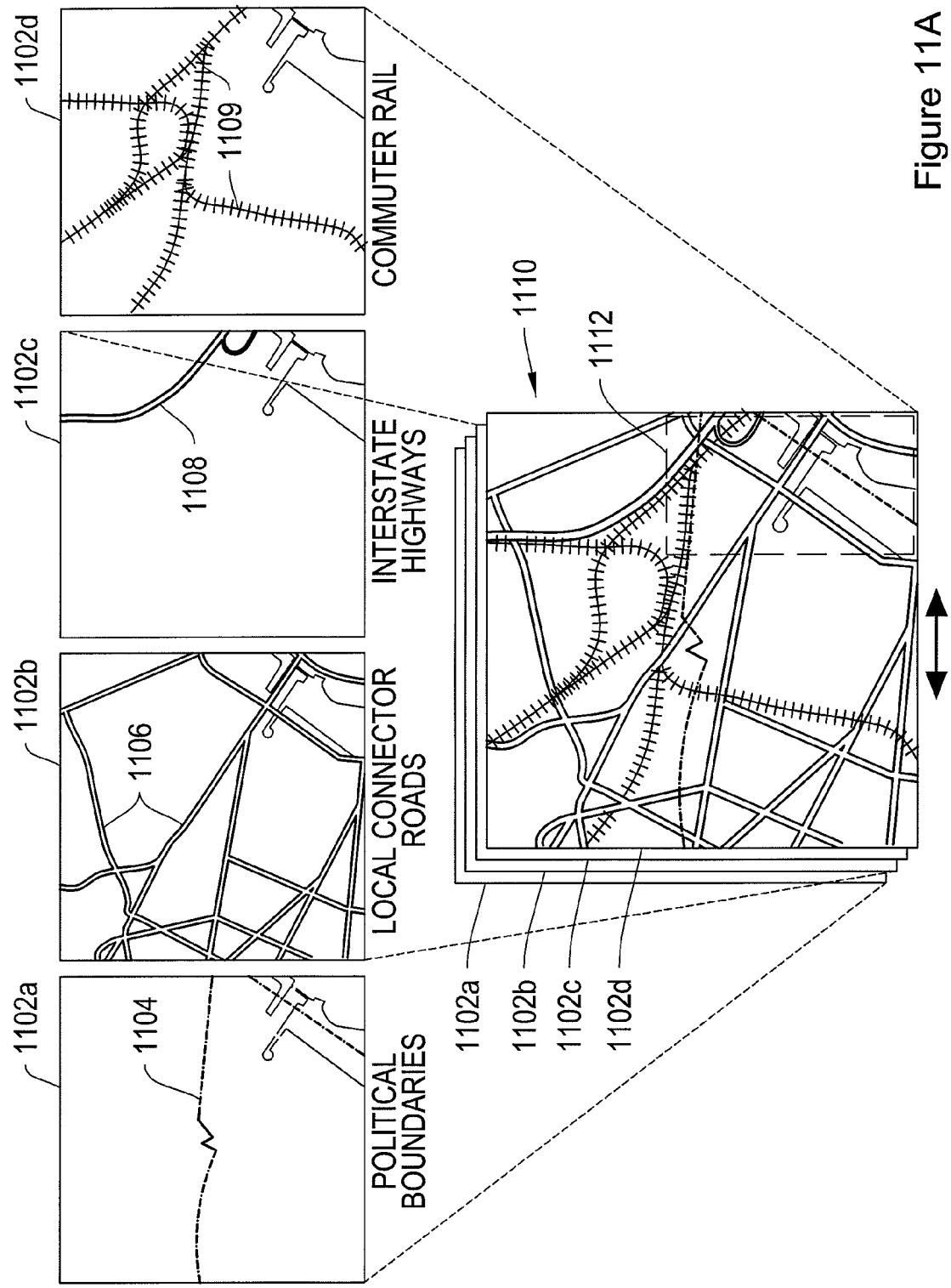
FIGS. 11A-11C are illustrative outputs of a geographic information system (GIS), according to an illustrative embodiment.
Figure 11B:
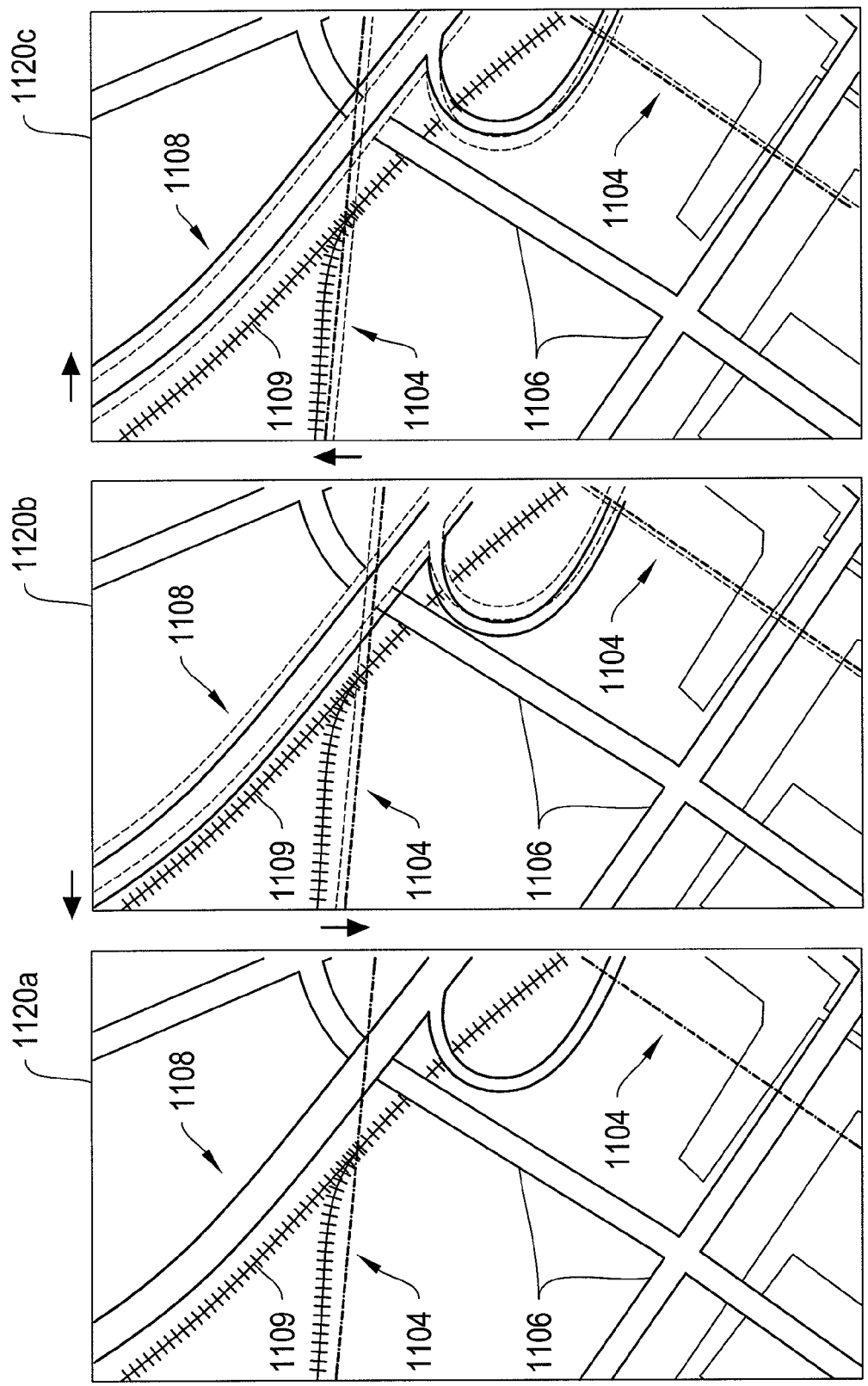
Figure 11C:
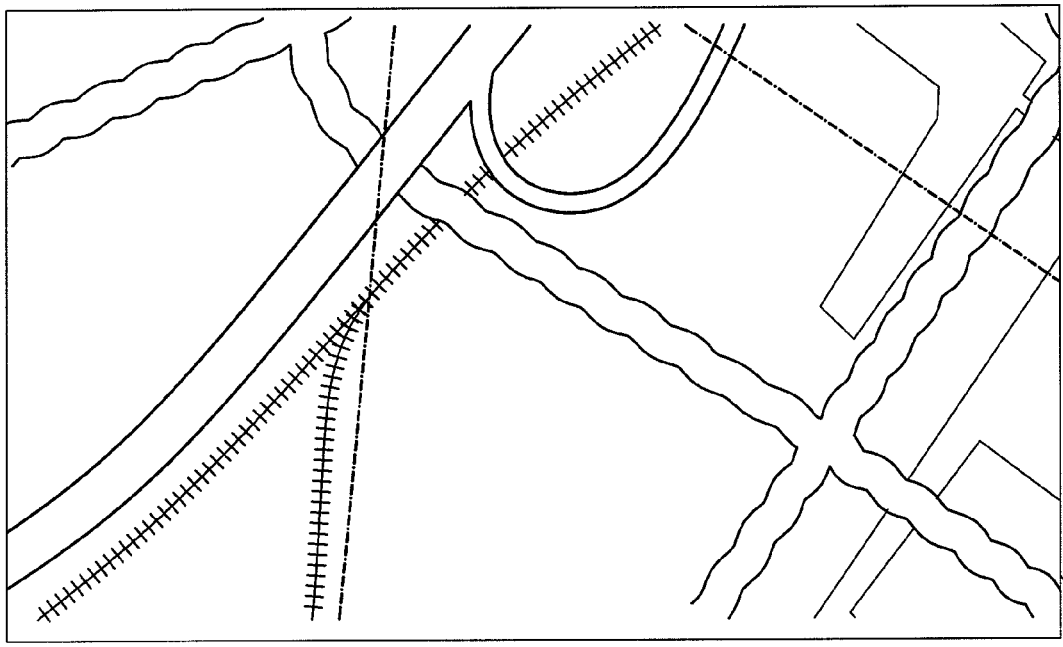
Figure 11C:
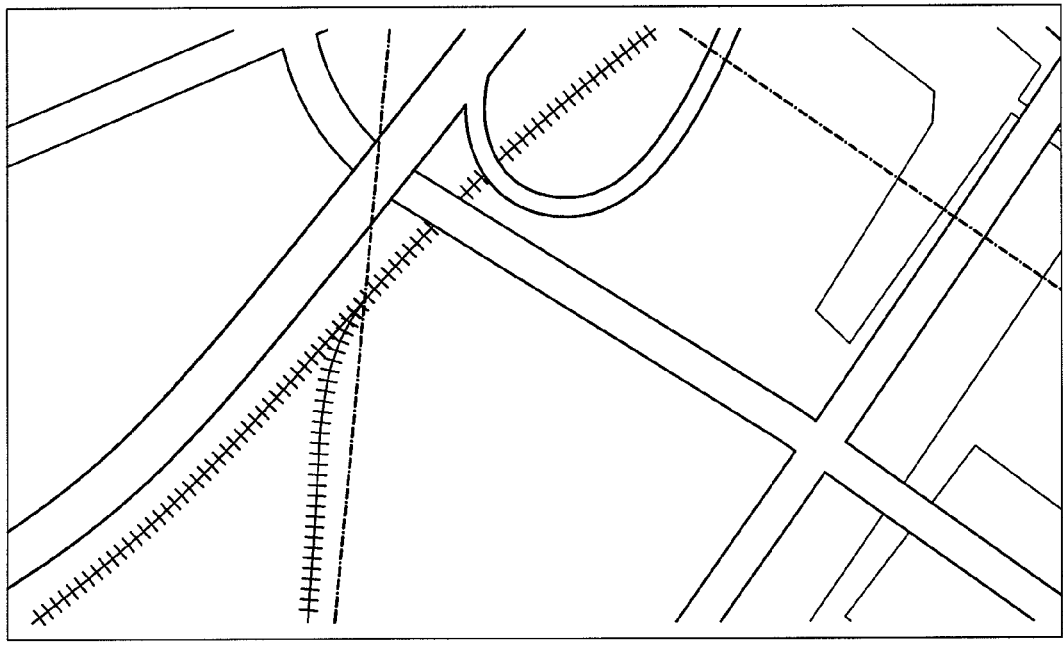

FIGS. 11A-11C are illustrative outputs of a geographic information system (GIS), according to an illustrative embodiment of the invention. GIS systems are one class of system that would benefit substantially from the layered display technique described above. In particular, the layered-display technique is particularly useful for naturally graphical data such as map data. Maps may include depictions of roads; utilities infrastructure, including power lines, sewage pipes, water main, gas pipes, telecommunications infrastructure, etc.; zoning information; geo-registered satellite or aerial imagery, including imagery generated from light in or out of the visible spectrum; radar information; or other visual representation of data corresponding to a mapped location, including population density, demographic data, meteorological data, intelligence data, vegetation type, etc. In a GIS each of these data types may be stored separately. Each data type may be stored in a single layer or in multiple layers. For example, road data may be stored as a layer of municipal roads, a layer of state roads, and a layer of federal highways. Zoning data maybe stored so that each zoning classification is stored as a separate layer, or it may be stored as a single map layer.

When viewed by a user, a map displayed by the GIS typically would include two or more layers overlaid one another. Preferably, at least one of the layers is displayed with at least some degree of transparency such that an underlying layer is at least partially visible underneath. As a result of the transparency, the color of at least some pixels in the displayed image at a given point in time are combinations or mixtures of the colors of associated with overlapping positions in the respective layers. As the layers are moved relative to one another, the colors of pixels change to take into account different mixtures and combinations of pixel colors from changes in positions that overlap.

A user of the GIS selects layers of interest using a user interface. In one implementation, a legend identifying each of the displayable layers is presented to a user. The user then can select the layers desired to be displayed by, for example, clicking a mouse on a check box to select a layer, and then selecting a desired motion from a drop down menu. Additional user interface controls may be made available to adjust the amplitude of the motion as well as the transparency of any of the layers. In an alternative embodiment, the user may select the layers to impart motion on by entering a query. Motion is then imparted on the layers that satisfy the query.

Referring specifically to FIG. 11A, FIG. 11A includes four individual layers 1102a-1102d (generally layers "1102") of geographical information, corresponding to overlapping geographical space, in this example, a portion of the Boston Metropolitan area. Layer 1102a includes political boundaries 1104. Layer 1102b includes local connector roads 1106. Layer 1102c includes interstate highways 1108. Layer 1102d includes commuter rail tracks 1109. The four layers can be displayed overlaid one another to form map 1110. Each layer 1102 is at least partially transparent such that features in the underlying layers are visible.

FIG. 11B includes three simulated screen shots 1120a-1120c (generally screen shots "1120") of a portion 1112, outlined in phantom, of the map 1110 FIG. 11A. The screen shots 1120a-1120c simulate the motion that may be imparted on one or more layers 1102d of a map, according to an illustrative embodiment, to highlight information included in the respective layers. In each screenshot 1120a-1120c, features from each of the layers 1102a-1102d are visible, including political boundary 1104, local connector roads 1106, interstate highways 1108, and rail tracks 1109.

Screen shot 1120*a* illustrates the portion of the map 1110 before any motion is imparted on any layers 1102. Screen shot 1120*b* illustrates the portion of the map at a first instant of time after motion has been imparted on the political boundary and interstate highway layers 1102*a* and 1102*c*, respectively. The original position of the political boundary 1104 and highway 1108 are depicted in phantom for reference. Screen shot 1120*c* illustrates the portion of the map 1110 at a second instant in time. As can be seen by comparing screen shot 1120*b* to 1120*c*, the political boundary layer 1102*a* has been put into a vertical oscillatory motion and the interstate highway layer 1102*c* has been put into a horizontal oscillatory motion. In alternative implementations, more dynamic oscillatory motions, including any other regular or irregular oscillatory movement may be employed without departing from the scope of the invention. The relative movement of the political boundary layer 1102*a* and the interstate highway layer 1102*c* relative to the remaining layers 1102*b* and 1102*d* serve to highlight to a viewer the position of the political boundaries 1104 and the highway 1108. FIG. 11C is discussed further below.

Figure 12A:
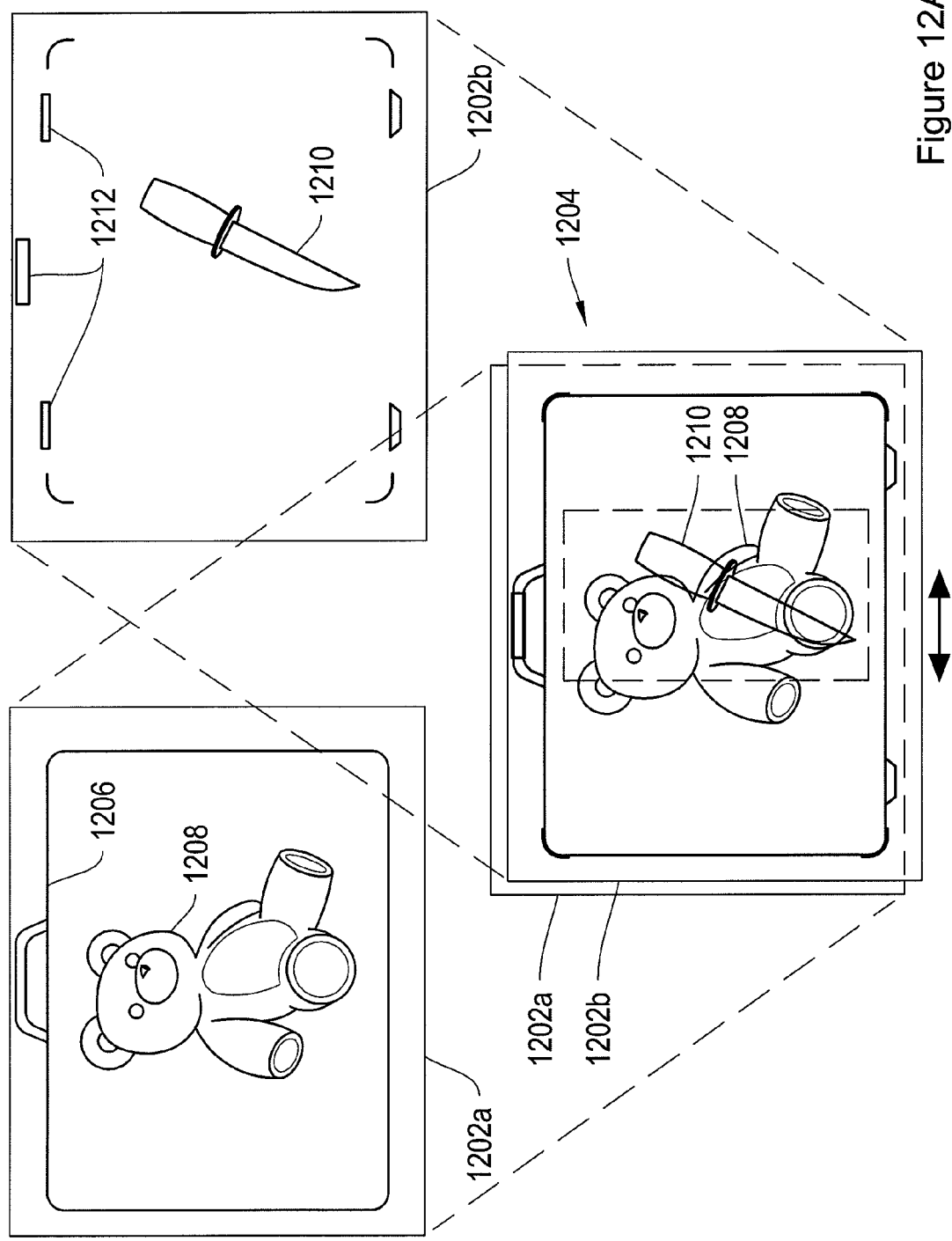
FIGS. 12A and 12B depict simulated outputs of an X-ray screening machine, according to an illustrative embodiment.
Figure 12B:
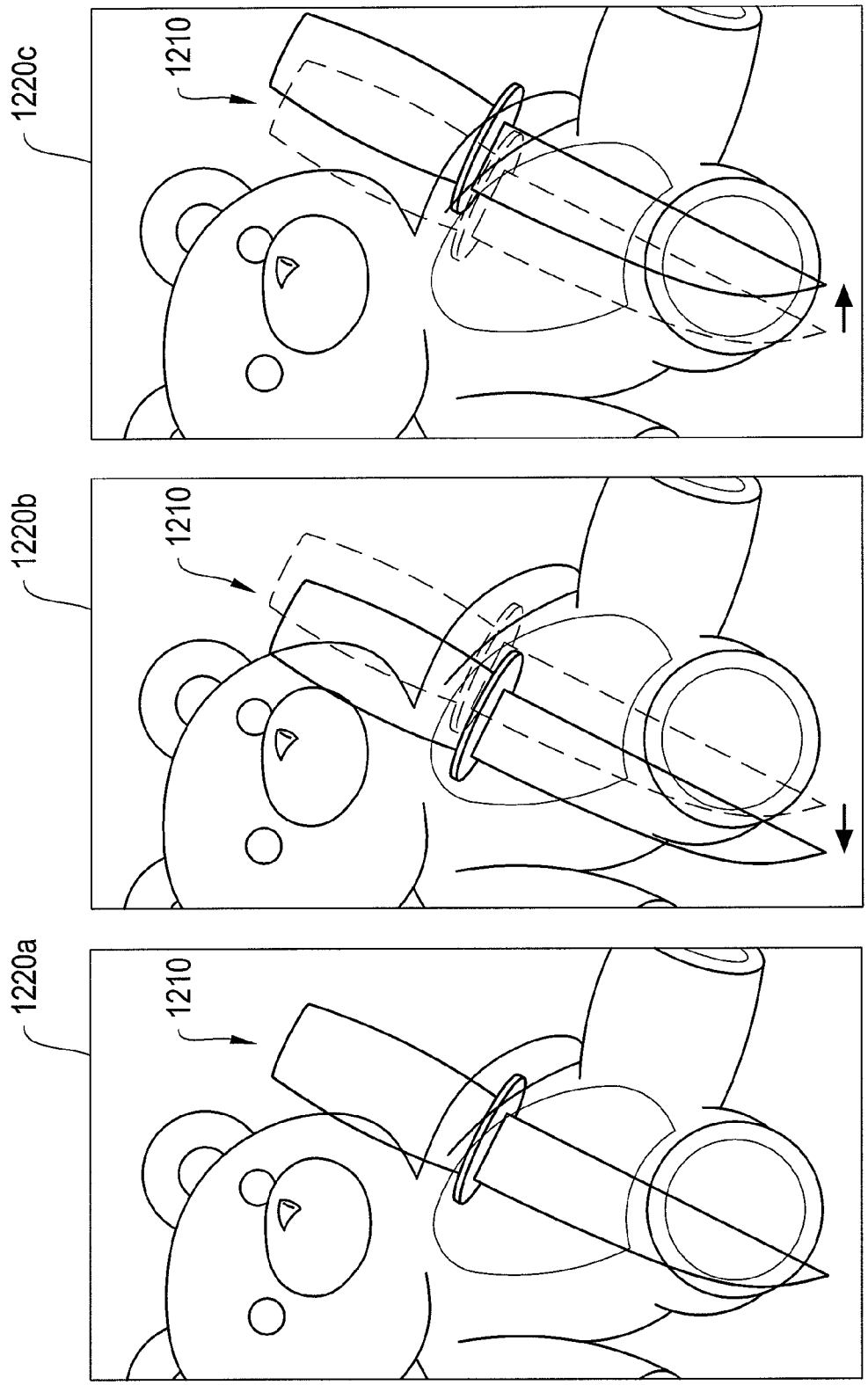

FIGS. 12A and 12B depict simulated outputs of an X-Ray screening machine incorporating the data visualization technology described herein. The X-Ray machine includes dual- or multi-energy level X-Ray beams generated by one or more X-Ray sources. The images generated from each respective X-Ray beam are saved as separate layers. The layers are then overlaid one another for presentation to a security screener. The X-Ray data collected from each source is color coded with a respective color, corresponding to the atomic number of the material detected in the X-Ray image. The coloring is omitted in the simulated outputs to retain clarity. To highlight materials having high levels of a suspicious material (e.g., metal or nitrogen), layers corresponding to such materials are automatically imparted with a predetermined motion relative to the remaining layers, such that such material can be readily observed in context with the location of the material in relation to other materials in an item being examined. Alternatively, a user of the X-Ray machine may manually select layers to impart motion to, as well as the desired motion. Additional controls may be used to adjust the amplitude of the motion and the transparency of the various layers.

Specifically with regard to FIG. 12A, FIG. 12A includes two simulated X-ray output layers 1202*a* and 1202*b*, and an overlay 1204 of the output layers 1202*a* and 1202*b*. Layer 1202*a* includes identified inorganic materials, i.e., a suitcase 1206 and a teddy bear 1208 included therein. Layer 1202*b* includes metal objects identified by an X-ray scan at a second energy level. The layer 1202*b* includes a knife 1210, as well as various metal components 1212 of the suitcase 1206. The overlay 1204 illustrates how the packer of the suitcase 1206 may have attempted to obscure the knife 1210 by placing it behind the teddy bear 1208. By imparting motion on the metal layer, a viewer of the overlay 1204 of the layers 1202*a* and 1202*b* is able to quickly identify the knife 1210.

FIG. 12B includes three screenshots 1220*a*-1220*c* of a portion of the simulated X-ray output of FIG. 12A (depicted in Figure A as the rectangular region enclosed by dashed lines). The first screen shot 1220*a* depicts the layers 1202*a* and 1202*b* in their original position. Screen shots 1220*b* and 1220*c* depict the overlay at two points in time. In each screen shot 1202*b* and 1202*c*, the phantom lines illustrate the original position of the knife 1210, as in screen shot 1220*a*. As with the depicted movement of map layer sin FIG. 11B, the depicted movement of layer 1202*b* is simplified to a simple horizontal oscillation. Imparted movement may include a simple oscillation as depicted, or a more dynamic complex oscillation.

Figure 13A:
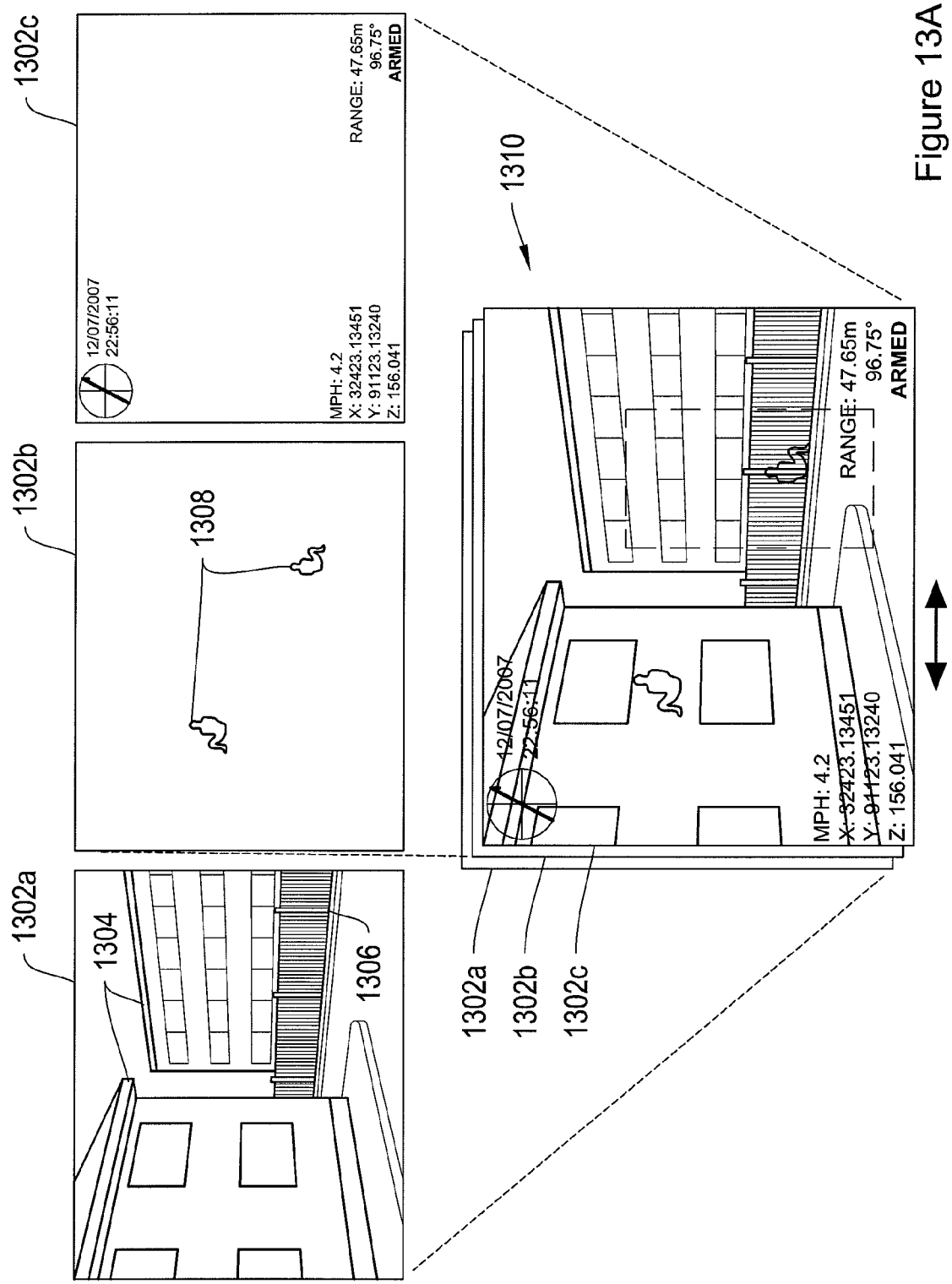
FIGS. 13A and 13B depict the output of a data visualization system integrated with a viewfinder, according to an illustrative embodiment.
Figure 13B:
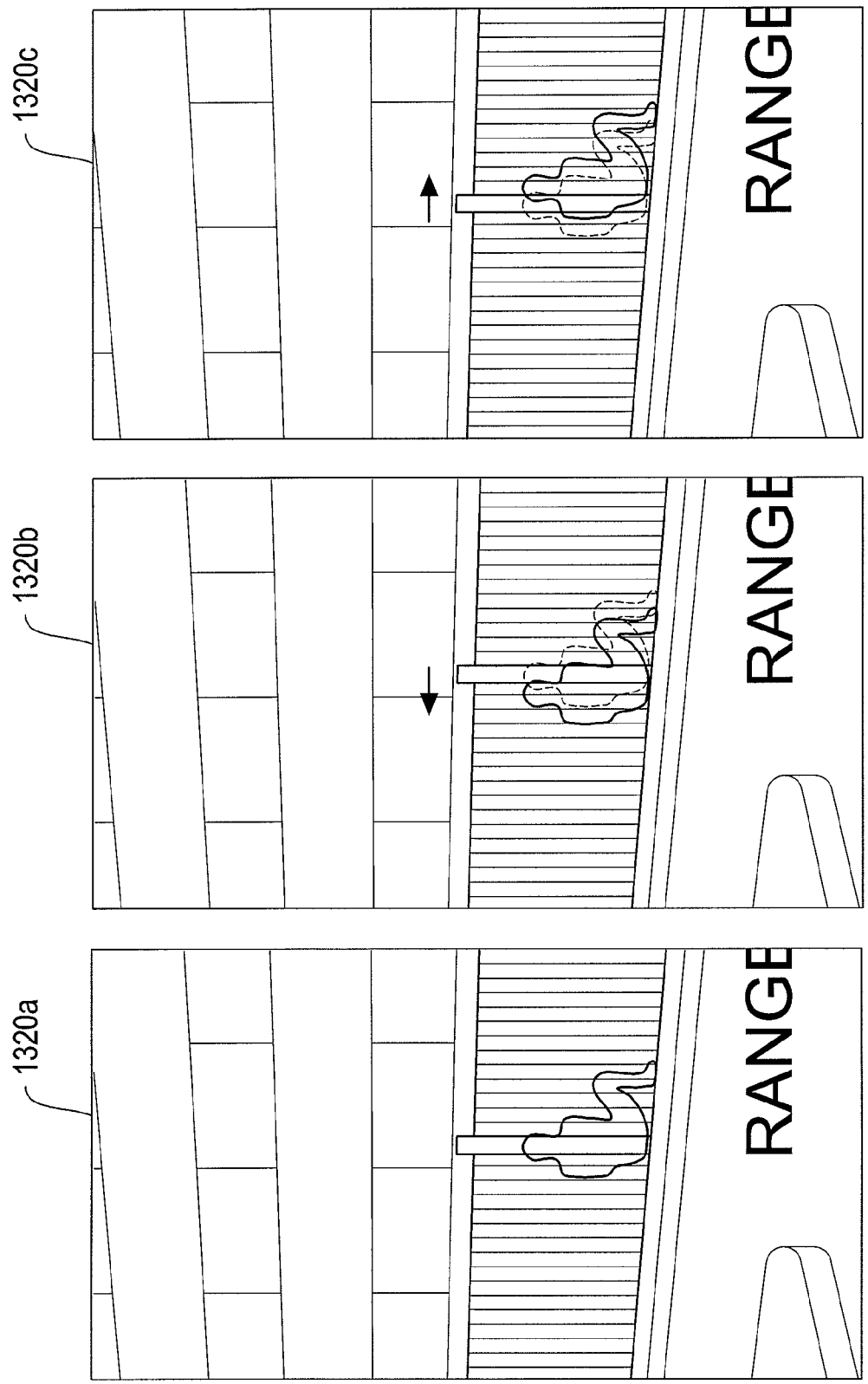

FIGS. 13A-13B depict the output of a data visualization system integrated with a viewfinder, for example, of a vehicle, such as a tank or an aircraft, according to an illustrative embodiment of the invention. Such viewfinders typically display data generated from visible light cameras as well as infrared sensors and/or radar systems. The viewfinder display may also include mission data and/or instrumentation data, including vehicle speed, location, target range, etc. In one illustrative implementation, the data visualization system integrated with the view finder stores visible light data, infrared data, mission data and instrumentation data as separate layers, which and then displayed overlaid one another. To draw attention to data in a particular layer, the data visualization system imparts motion to the particular layer relative to the remaining layers.

FIG. 13A depicts three separate layers 1302*a*-1302*c* of simulated graphical data that may be overlaid one another to form the output of a viewfinder. Layer 1302*a* includes an image taken from a visible light imaging device. Visible in layer 1302*a* are two buildings 1304 and a fence 1306. Layer 1302*b* includes an image taken from an infrared imaging source. In layer 1302*b*, people 1308 are visible crouched behind the fence 1306 and below a window in the second floor of one of the buildings 1304. Layer 1302 includes computer generated mission data, including speed, current coordinates, target coordinates, and a weapon status indicator.

Overlay 1310 depicts the results of graphically overlaying the three layers 1302*a*-1302, with each layer being at least partially transparent such that features of underlying layers are visible. FIG. 13B illustrates how one of the layers can be oscillated relative to the other layers to highlight information included in the oscillating layer. FIG. 13B includes three screenshots 1320*a*-1320*c* of an overlay of the three layers 1302*a*-1302*c*. As with FIGS. 11B and 12B, the first screen shot 1320*a* of FIG. 13B depicts the original alignment of the layers 1302*a*-1302*c*. The remaining screen shots 1320*b* and 1320*c* depict the overlay at various times while the layer including infrared data is put into oscillation. The original alignment is indicated in phantom. The phantom lines are included in these figures merely for reference and are not intended to suggest that a viewer would actually see such phantom lines in practice. In some implementations, in which object recognition software is employed, such phantom depiction may be utilized.

In alternative implementations, the data displayed in layers by the data visualization system is not received as distinct layers. Instead, the data is divided into layers having common characteristics after receipt. In one implementation, a machine learning program may identify features in an image and store such features in a layer distinct from the remainder of the image. For example, the data visualization system detects objects of interest in an image using object-class detection algorithms known in the art. In processing a photograph, the data visualization system may detect, for example, faces and/or text characters and store each in a respective layer. The data visualization system then displays the layers overlaid one another. To draw attention to all faces in the image, the data visualization system imparts motion to the layer in the image corresponding to faces. To highlight text, the data visualization system imparts motion to the layer in the image corresponding to text characters.

Similar data analysis can be applied to other forms of image data, including sonar, radar, or infrared images, in which objects of interest, e.g., submarines, aircraft, or roads, respectively, can be detected based on known signatures. Regions of the images having such signatures are stored in respective layers for overlaid display. Similar processing may be carried out on medical images, including x-rays, catscans, MRIs, etc. For example, portions of images corresponding to particular tissue densities or ranges of tissues densities may be stored in a separate layers. The data visualization system then, automatically in response to software instructions executing on the data visualization system, or manually in response to user input, imparts motion on one or more of the layers to highlight the data stored therein. In the medical image context, selective motion of portions of a medical image based on tissue density may reveal features otherwise difficult to identify, including tumors, nerves, or vasculature.

In another implementation, in addition to the data visualization system highlighting data by imparting motion on a layer of data relative to a remainder of layers, the data visualization system visually conveys additional data by imparting a local motion on a portion of a layer relative to the remainder of the layer. Suitable local motions include harmonic vibrations of regions of the layer similar to those describe above, as well as distortions to regions of the layer. The distortions may result, for example, in the region of the layer appearing to ripple, as if a viewer were viewing the layer through water.

In the context of a map, for example, the data visualization system may impart motion upon a map layer corresponding to highways relative to a terrain image layer and an electrical grid layer, thus visually highlighting the location of roads on the map relative to the surrounding terrain and electrical infrastructure. To simultaneously highlight which roads are experiencing high levels of congestion, the data visualization system imparts a local motion on portions of the layer surround the congested roads such that the roads in that region move or distort relative to the remainder of the road map layer. At the same time, even though the layer corresponding to the electrical grid is not moving relative, the data visualization system may impart a different local motion on regions to portions of the electrical grid map layer corresponding to regions having increased power consumption.

FIG. 11C illustrates one such distortion effect. FIG. 11C includes two screen shots 1130*a* and 1130*b* of the portion of the map 1110. Screen shot 1130*a* depicts the portion without distortion. In screen shot 1130*b*, local roads in the portion are distorted to depict high traffic volumes.

Several techniques for implementing localized layer distortion are known in the art, for example, in the context of computer gaming. Software supporting such visual effects include DirectX and OpenGL. In one particular implementation, in order to allow for computationally efficient methods of imparting local distortions to regions of layers, each layer of visual data to be displayed is first projected onto a transparent array of geometric shapes, for example triangles. The data visualization system displays the projections overlaid one another. To generate the local distortions, the data visualization system imparts a rhythmic shifting to the vertices of the geometric shapes in a particular area, stretching or shrinking the content filling the geometric shapes. Additional rippling techniques, as well as different and/or additional visual effects may be used to impart local motion on a portion of a layer without departing from the scope of the invention.

In still another implementation, instead of or in addition to imparting a local motion on a region of a layer (referred to as a data layer), one or more additional layers of visual effects are added to a set of overlaid data layers displayed to a user. The visual effect layers include opaque or partially transparent localized visual effects that include some form of dynamic movement. Suitable visual effects include fog, mist, rippling water, smoke, etc. The primary difference between the visual effects in the visual effects layer from the localized movement or distortion imparted on portions of data layers is that the visual effects in the visual effects layer preferably are colored such that the color of portions of underlying layers change as a result of the dynamic movement of the visual effects. In contrast, the localized movement imparted on data layers does not directly affect the color of the image data in the data layer. Instead, any color changes in the displayed image result from changing combinations of the colors associated with overlapping positions in the data layers as points in each layer overlap in different ways as the portions of the data layer move or distort.

Although the present invention has been particularly shown and described above with reference to illustrative embodiments, alterations and modifications thereof may become apparent to those skilled in the art. It is therefore intended that the following claims cover all such alterations and modifications as fall within the true spirit and scope of the present invention.

What is claimed is:

1. A method for displaying data comprising:
   a processor displaying a plurality of layers of graphical data overlaid one another; and
   the processor imparting a first oscillatory motion to a first of the displayed layers relative to a remainder of the displayed layers to highlight data represented in the first layer.

2. The method of claim 1, wherein at least one of the plurality of displayed layers is at least partially transparent.

3. The method of claim 1, wherein at least one of the plurality of displayed layers corresponds to map data.

4. The method of claim 1, wherein at least one of the plurality of displayed layers corresponds to medical image data.

5. The method of claim 1, wherein at least one of the plurality of displayed layers corresponds to security screening data.

6. The method of claim 1, wherein at least one layer in the plurality of displayed layers includes image data generated by the processor from a different imaging source than used to generate image data for a second layer in the plurality of displayed layers.

7. The method of claim 6, wherein the different imaging sources captures image data using different imaging techniques.

8. The method of claim 1, comprising:
   the processor receiving data for display, and
   the processor generating the plurality of displayed layers from the received data by storing the received data in respective ones of the plurality of displayed layers such that the data stored in each respective layer shares a common characteristic with the remaining data stored in each respective layer.

9. The method of claim 1, comprising the processor imparting a localized motion on a first area of the first layer that is different than a localized motion imparted on a second area of the first layer to visually distinguish characteristics of data within the first layer.

10. The method of claim 9, wherein the first layer comprises an image projected on an array of geometric shapes, and imparting the localized motion comprises shifting vertices geometric shapes in the first area.

11. The method of claim 9, wherein the localized motion imparted on the first area is one of harmonic vibration, distortion, rhythmic contraction, and rhythmic expansion.

12. The method of claim 9, wherein the localized motion imparted on the second area is one of harmonic vibration, distortion, rhythmic contraction, and rhythmic expansion.

13. The method of claim 1, comprising the processor receiving an input from a user identifying data to be highlighted, and the processor determining the imparted motion in response to the user input.

14. The method of claim 1, wherein the user input comprises a query.

15. The method of claim 1, wherein the oscillatory first motion is one of horizontal, vertical, circular, complex, contraction, expansion, and dynamic.

16. A system for displaying data comprising:
a display;
a memory for storing graphical data;
a processor configured for:
displaying a plurality of layers of graphical data stored in the memory overlaid over one another;
imparting a first oscillatory motion to a first of the displayed layers relative to a remainder of the displayed layers to highlight data represented in the first layer.

17. The system of claim 16, comprising a plurality of image sources, wherein each image source generates graphical data corresponding to a respective layer of the plurality of displayed layers.

18. The system of claim 16, wherein the processor is configured to generate the plurality of displayed layers such that the data stored in each respective layer shares a common characteristic with the remaining data stored in each respective layer.

19. The system of claim 16, wherein the processor is configured to impart a localized motion on a first area of the first layer that is different than a localized motion imparted on a second area of the first layer to visually distinguish characteristics of data within the first layer.

20. The system of claim 19, wherein the localized motion imparted on the first area is one of harmonic vibration, distortion, rhythmic contraction, and rhythmic expansion.

21. The system of claim 19, wherein the localized motion imparted on the second area is one of harmonic vibration, distortion, rhythmic contraction, and rhythmic expansion.

22. The system of claim 16, wherein the first oscillatory motion is one of horizontal, vertical, circular, complex, contraction, expansion, and dynamic.

23. A computer readable medium storing computer executable instructions, which, when executed by a processor, cause the processor to carryout a method for displaying data comprising:
displaying a plurality of displayed layers of graphical data overlaid over one another;
imparting a first oscillatory motion to a first of the displayed layers relative to a remainder of the displayed layers to highlight data represented in the first layer.

24. The computer readable medium of claim 23, wherein at least one of the plurality of displayed layers is at least partially transparent.

25. The computer readable medium of claim 23, wherein at least one layer in the plurality of displayed layers includes image data generated by a different imaging source than used to generate image data for a second layer in the plurality of displayed layers.

26. The computer readable medium of claim 23, wherein the different imaging sources captures image data using different imaging techniques.

27. The computer readable medium of claim 23, storing instructions for causing the processor to:
receive data for display, and
generate the plurality of layers from the received data by storing the received data in respective ones of the plurality of displayed layers such that the data stored in each respective layer shares a common characteristic with the remaining data stored in each respective layer.

28. The computer readable medium of claim 23, storing a instructions for causing the processor to impart a localized motion on a first area of the first layer that is different than a localized motion imparted on a second area of the first layer to visually distinguish characteristics of data within the first layer.

29. The computer readable medium of claim 28, wherein the first layer comprises an image projected on an array of geometric shapes, and imparting the localized motion comprises shifting vertices geometric shapes in the first area.

30. The computer readable medium of claim 28, wherein the localized motion imparted on the first area is one of harmonic vibration, distortion, rhythmic contraction, and rhythmic expansion.

31. The computer readable medium of claim 28, wherein the localized motion imparted on the second area is one of harmonic vibration, distortion, rhythmic contraction, and rhythmic expansion.

32. The computer readable medium of claim 23, storing instructions for causing the processor to receive an input from a user identifying data to be highlighted, and to determine the imparted motion in response to the user input.

33. The computer readable medium of claim 32, wherein the user input comprises a query.

34. The computer readable medium of claim 23, wherein the first oscillatory motion is one of horizontal, vertical, circular, complex, contraction, expansion, and dynamic.

* * * * *